(12) United States Patent
Murai (10) Patent No.: US 9,014,949 B2
(45) Date of Patent: Apr. 21, 2015

(54) APPARATUS FOR AND METHOD OF CONTROLLING INTERNAL COMBUSTION ENGINE

(75) Inventor: Atsushi Murai, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 537 days.

(21) Appl. No.: 13/465,413

(22) Filed: May 7, 2012

(65) Prior Publication Data

US 2013/0024093 A1 Jan. 24, 2013

(30) Foreign Application Priority Data

Jul. 21, 2011 (JP) ................................. 2011-160142

(51) Int. Cl.
*G06F 17/00* (2006.01)
*F02D 41/30* (2006.01)
*F02M 35/10* (2006.01)
*F02M 35/108* (2006.01)
*F02B 17/00* (2006.01)
*F02M 25/07* (2006.01)
*F02D 13/02* (2006.01)
*F02D 41/00* (2006.01)

(52) U.S. Cl.
CPC ............ *F02D 41/3023* (2013.01); *F02D 41/30* (2013.01); *F02M 35/10177* (2013.01); *F02M 35/1085* (2013.01); *F02B 17/00* (2013.01); *F02M 25/0752* (2013.01); *F02D 13/0234* (2013.01); *F02D 13/0257* (2013.01); *F02D 41/0062* (2013.01); *F02D 2041/001* (2013.01); *Y02T 10/18* (2013.01); *F02D 41/006* (2013.01); *Y02T 10/146* (2013.01); *Y02T 10/12* (2013.01); *Y02T 10/14* (2013.01); *Y02T 10/47* (2013.01)

(58) Field of Classification Search
CPC ............ F01L 1/3442; F01L 1/34; F01L 1/344; F01L 13/0036; F02D 13/02; F02D 41/0002; F02D 29/02; F02D 41/0025; F02D 41/3005; B60W 10/06
USPC ........................ 123/90.1, 90.15; 701/101–108
See application file for complete search history.

(56) References Cited

U.S. PATENT DOCUMENTS

2009/0217893 A1  9/2009  Fujita
2012/0210979 A1* 8/2012  Okumura et al. ............. 123/445

FOREIGN PATENT DOCUMENTS

| JP | 2004-044548 A | 2/2004 |
| JP | 2004-190514 A | 7/2004 |
| JP | 2008-255866 A | 10/2008 |
| JP | 2009-197597 A | 9/2009 |
| WO | WO 2011/055629 A1 | 5/2011 |

* cited by examiner

*Primary Examiner* — Hai Huynh
*Assistant Examiner* — Raza Najmuddin
(74) *Attorney, Agent, or Firm* — Foley & Lardner LLP (57) ABSTRACT

A control apparatus for an internal combustion engine where the inside of a combustion chamber is divided into a layer of internal EGR gas and a combustible layer to perform stratified combustion. In a port-injected engine equipped with first and second intake valves, the opening timing of the first intake valve is set before a top dead center (TDC) and the opening timing of the second intake valve is set after the TDC, and the closing timings of the first intake valve and the second intake valve are set after a bottom dead center. Then, fuel injection toward the first intake valve is started after the EGR gas, which was blown back to the intake port upstream of the first intake valve, is drawn into the combustion chamber after the top dead center.

10 Claims, 12 Drawing Sheets

| | VALVE TIMING | EFFECT |
|---|---|---|
| FUEL ECONOMY (LOW LOAD) | TDC SECOND / BDC FIRST | IMPROVEMENT IN DEGREE OF STRATIFICATION<br><br>IMPROVEMENT IN FUEL ECONOMY |
| KNOCKING (HIGH LOAD) | TDC / BDC | REDUCTION IN RESIDUAL GAS<br><br>SHORTENING OF COMBUSTION PERIOD |
| EXHAUST GAS PURIFICATION | TDC / BDC | ENHANCEMENT OF FLUIDITY OF GAS<br><br>INCREASE IN EXHAUST GAS TEMPERATURE |
| IMPROVEMENT OF ENGINE POWER | TDC / BDC | INCREASE IN VOLUMETRIC EFFICIENCY |

APPARATUS FOR AND METHOD OF CONTROLLING INTERNAL COMBUSTION ENGINE

BACKGROUND OF THE INVENTION

1. Field of the Invention

The present invention relates to a control apparatus and a control method for an internal combustion engine that divides the inside of a combustion chamber into a layer of internal EGR gas and a combustible layer to perform stratified combustion.

2. Description of Related Art

Conventionally, as disclosed in Japanese Laid-Open Patent Publication No. 2008-255866, there has been an internal combustion engine that divides the inside of a combustion chamber into a layer of internal EGR gas and a combustible layer to ignite the combustible layer to thereby perform stratified combustion.

In the internal combustion engine, internal EGR gas is introduced into a first intake port located upstream of a first intake valve in an exhaust stroke. Then, in an intake stroke, the internal EGR gas in the first intake port is introduced into a combustion chamber through the first intake valve and fresh air in a second intake port located upstream of a second intake valve is introduced into the combustion chamber to generate a layer of internal EGR gas and a combustible layer in the combustion chamber.

In the meantime, in the conventional technique, the first intake valve provided in the first intake port into which the internal EGR gas is introduced is closed in the middle of the intake stroke. This results in interrupting the introduction of intake air through the first intake port in the middle of the intake stroke. As a result, the gas flow in the combustion chamber is weakened, causing a problem that mixing of fresh air and fuel cannot be promoted sufficiently.

Here, if the gas flow is enhanced, mixing of fresh air and fuel can be promoted. However, when the gas flow is enhanced, fuel is more likely to be mixed into internal EGR gas and the amount of internal EGR gas cannot be increased sufficiently.

SUMMARY OF THE INVENTION

Therefore, it is an object of an aspect of the present invention to provide an apparatus for and method of controlling an internal combustion engine capable of suppressing mixing of fuel into internal EGR gas while enhancing the gas flow to promote mixing of fresh air and fuel.

In order to achieve the above object, the control apparatus for an internal combustion engine according to an aspect of the present invention is a control apparatus for an internal combustion engine equipped with a first intake valve and a second intake valve provided in each combustion chamber, a fuel injector provided in an intake port to inject fuel toward each of the first intake valve and the second intake valve, and a variable valve mechanism for changing the valve timing of the first intake valve and the valve timing of the second intake valve to valve timings different from each other, the control apparatus including:

a first control section for controlling the variable valve mechanism to set the opening timing of the first intake valve before a top dead center and the opening timing of the second intake valve after the top dead center, and set both the closing timing of the first intake valve and the closing timing of the second intake valve after a bottom dead center; and a second control section for setting the fuel injection start timing of the fuel injector toward the first intake valve to a timing delayed from the top dead center in the valve timing settings made by the first control section.

The control method for an internal combustion engine according to an aspect of the present invention is a control method for an internal combustion engine equipped with a first intake valve and a second intake valve provided in each combustion chamber, a fuel injector provided in an intake port to inject fuel toward each of the first intake valve and the second intake valve, and a variable valve mechanism for changing the valve timing of the first intake valve and the valve timing of the second intake valve to valve timings different from each other, the control method including the steps of:

setting the opening timing of the first intake valve before a top dead center;

setting the opening timing of the second intake valve after the top dead center;

setting both the closing timing of the first intake valve and the closing timing of the second intake valve after a bottom dead center; and in the valve timings, setting the fuel injection start timing of the fuel injector toward the first intake valve to a timing delayed from the top dead center.

Other objects and features of an aspect of the present invention will become understood from the following description with reference to the accompanying drawings.

DESCRIPTION OF THE PREFERRED EMBODIMENTS

Figure 1:
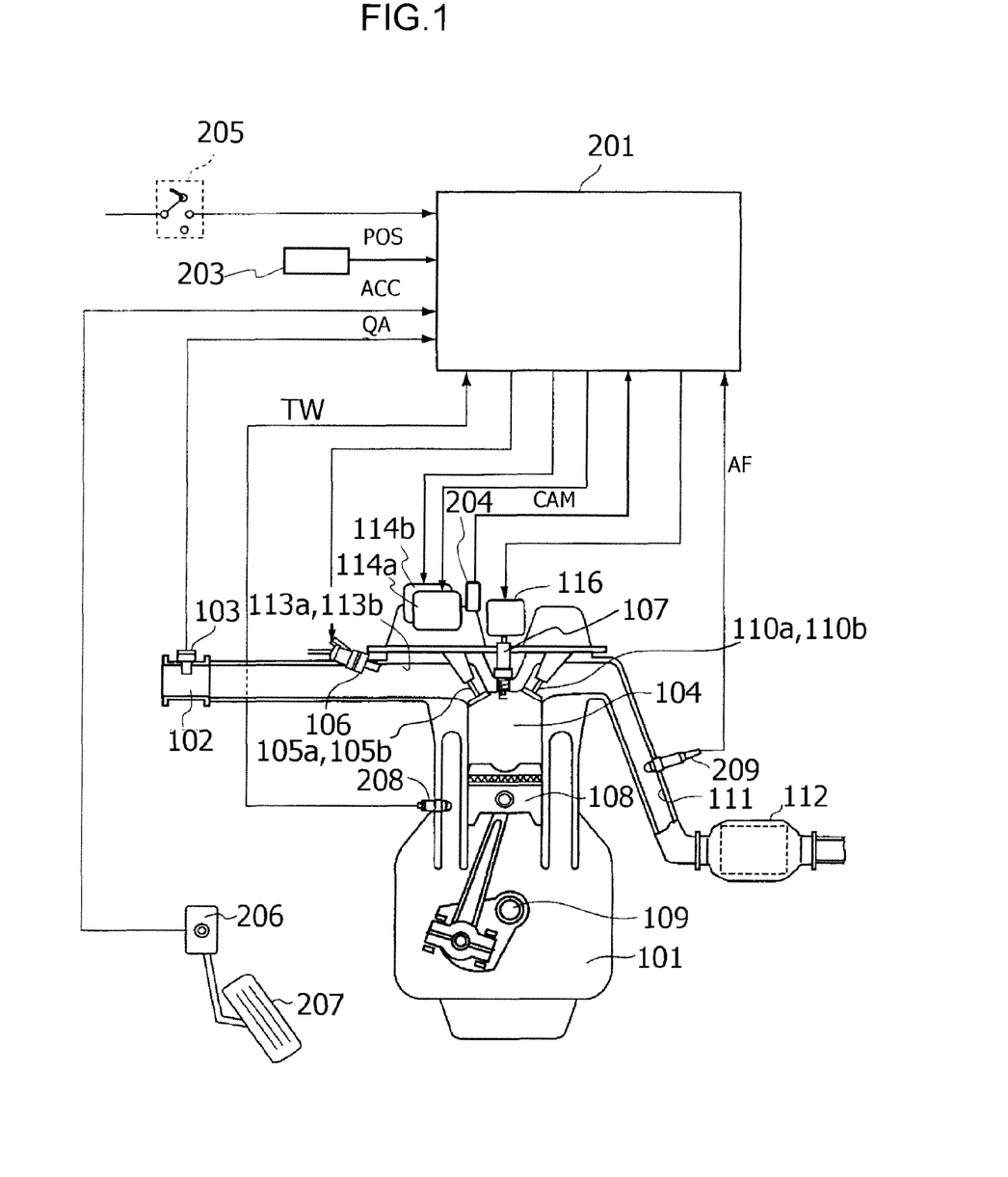
FIG. 1 is a block diagram of an engine according to a preferred embodiment of the present invention.

FIG. 1 is a diagram illustrating a vehicle engine system to which a control apparatus according to the present invention is applied.

An engine 101 illustrated in FIG. 1 is a serial multi-cylinder internal combustion engine, however, it may be a V type or horizontal-opposed engine.

In an intake pipe 102 for introducing air into each cylinder of engine 101, an intake air amount sensor 103 is provided to detect an intake air amount QA of engine 101. As the intake air amount sensor 103, for example, a hot-wire flowmeter for detecting the mass flow rate of intake air or the like may be used.

In each combustion chamber 104, a first intake valve 105a and a second intake valve 105b for opening and closing an intake port of combustion chamber 104 are provided. Furthermore, a fuel injection valve 106 is provided for each cylinder in an intake port portion of intake pipe 102 upstream of intake valves 105a and 105b.

Fuel injected from fuel injection valve 106 into combustion chamber 104 through intake valves 105a and 105b is drawn together with air. The fuel in the combustion chamber is ignited and burned by spark ignition by means of a spark plug 107. Then, the firing pressure forces a piston 108 downward toward a crank shaft 109 to drive crank shaft 109 to rotate.

Furthermore, in each combustion chamber 104, a first exhaust valve 110a and a second exhaust valve 110b for opening and closing an exhaust port of combustion chamber 104 is provided. Exhaust valves 110a and 110b are opened to discharge exhaust gas into an exhaust pipe 111.

A catalytic converter 112 equipped with three-way catalyst or the like is disposed in exhaust pipe 111. Catalytic converter 112 purifies exhaust gas.

As mentioned above, engine 101 equipped with two intake valves 105a and 105b and two exhaust valves 110a and 110b for each cylinder. A first intake port 113a upstream of first intake valve 105a and a second intake port 113b upstream of second intake valve 105b are joined together and connected to intake pipe 102.

Intake valves 105a, 105b and exhaust valve 110a, 110b are operated along with the rotation of an intake air camshaft and an exhaust camshaft driven to rotate through crank shaft 109.

Two exhaust valves 110a and 110b are opened at certain valve timing. On the other hand, the valve timings of two intake valves 105a, 105b vary depending on variable valve mechanisms 114a and 114b.

First variable valve mechanism 114a is a known mechanism for changing the rotational phase of the intake air camshaft relative to crank shaft 109 to continuously change the phases of valve operation angles of intake valves 105a and 105b.

Second variable valve mechanism 114b is a mechanism for making the valve timing of second intake valve 105b variable without varying the valve timing of first intake valve 105a. This second variable valve mechanism 114b can vary the valve timing of second intake valve 105b from the same timing as that of first intake air valve 105a to a different timing.

As second variable valve mechanism 114b, a mechanism disclosed in Japanese Laid-Open Patent Publication No. 2008-255866, Japanese Laid-Open Patent Publication No. 2008-255866, Japanese Laid-Open Patent Publication No. 2009-197597, or the like may be employed.

A mechanism disclosed in Japanese Laid-Open Patent Publication No. 2008-255866 is a mechanism for changing the angle of control axis to make the maximum amount of valve lift of the intake valve continuously variable together with the valve operation angle. The mechanism disclosed in Japanese Laid-Open Patent Publication No. 2008-255866 is a mechanism for switching a cam used to drive the intake valve to either a first cam with a large operation angle or a second cam with a small operation angle. A mechanism disclosed in Japanese Laid-Open Patent Publication No. 2009-197597 is a mechanism equipped with multiple cam noses provided for one valve and a device for transmitting the driving force of one of the multiple cam noses to the valve.

Figure 2:
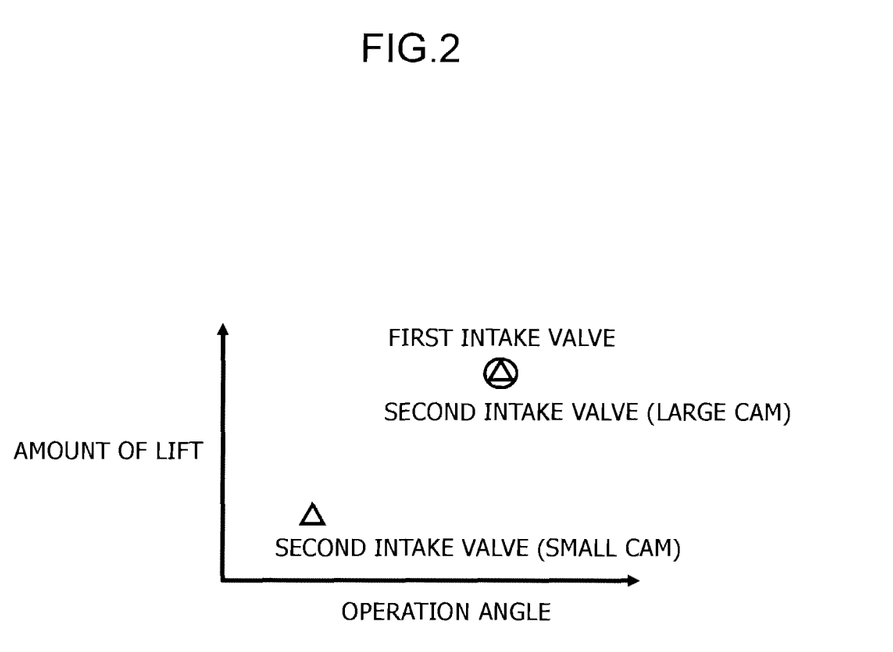
FIG. 2 is a diagram illustrating the characteristics of a variable valve mechanism according to the embodiment of the present invention.

Here, in the case in which the mechanism for switching the cam is used as second variable valve mechanism 114b, as illustrated in FIG. 2, the setting is so made that when the cam with the large operation angle is selected, the amount of valve lift and valve operation angle of first intake valve 105a is almost the same as those of second intake valve 105b, while when the cam with the small operation angle is selected, the amount of valve lift and valve operation angle of second intake valve 105b is smaller than those of first intake valve 105a.

Figure 3:
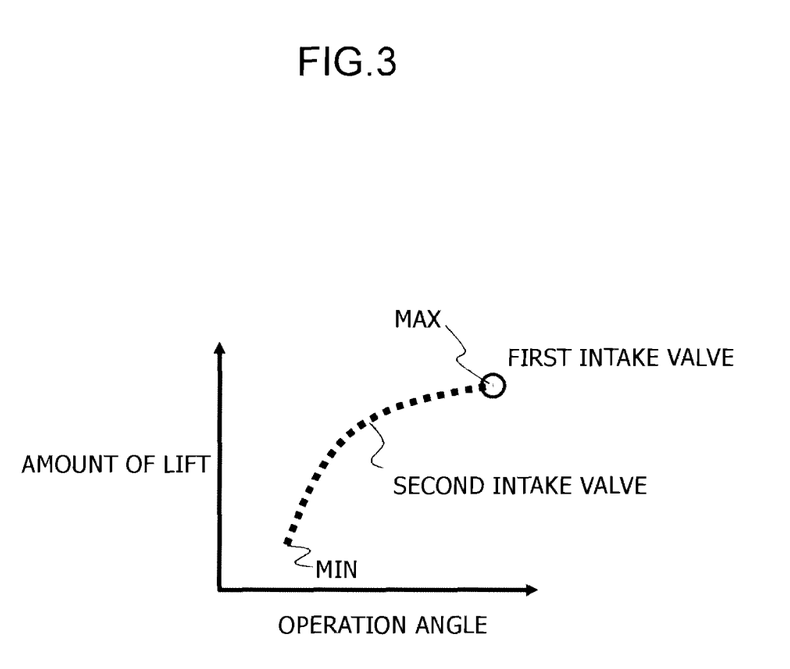
FIG. 3 is a diagram illustrating the characteristics of the variable valve mechanism according to the embodiment of the present invention.

Furthermore, in the case in which the mechanism for making the maximum amount of valve lift continuously variable is used as second variable valve mechanism 114b, as illustrated in FIG. 3, the setting is so made that the maximum amount of valve lift and valve operation angle equal to the amount of valve lift and valve operation angle of first intake valve 105a, and the maximum amount of valve lift and valve operation angle when the cam with the small operation angle is selected as mentioned above are included in a variable range of the maximum amount of valve lift and valve operation angle of second intake valve 105b.

An ignition module 116 is directly mounted on each of spark plugs 107 to supply ignition energy to spark plug 107. Ignition module 116 is equipped with a spark coil and a power transistor for controlling energization to the spark coil.

A control apparatus 201 includes a computer to take in signals input from various sensors and switches to perform arithmetic processing in accordance with a prestored program. Then, control apparatus 201 outputs manipulated variable of fuel injection valve 106, variable valve mechanisms 114a and 114b, ignition module 116, and the like.

Control apparatus 201 takes in not only an signal output from intake air amount sensor 103, but also signals output from a crank angle sensor 203 for outputting a rotational angle signal POS of crank shaft 109, an accelerator opening sensor 206 for detecting accelerator opening ACC of a throttle pedal 207, a cam angle sensor 204 for outputting a rotational angle signal CAM of an intake camshaft, a water temperature sensor 208 for measuring the temperature TW of cooling water for engine 101, an air-fuel sensor 209 for measuring an air-fuel ratio AF based on the oxygen level in exhaust gas, and the like. Control apparatus 201 further takes in a signal output from an ignition switch 205 as a main switch to start and stop engine 101.

Here, control of variable valve mechanisms 114a and 114b by control apparatus 201 will be schematically described with reference to FIG. 4.

Based on various operating conditions such as the load on engine 101, the revolution speed and temperature of engine 101, control apparatus 201 sets the valve timing of each of intake valves 105a and 105b to be suited to each operating condition and controls variable valve mechanisms 114a and 114b to achieve this valve timing.

Figure 4:
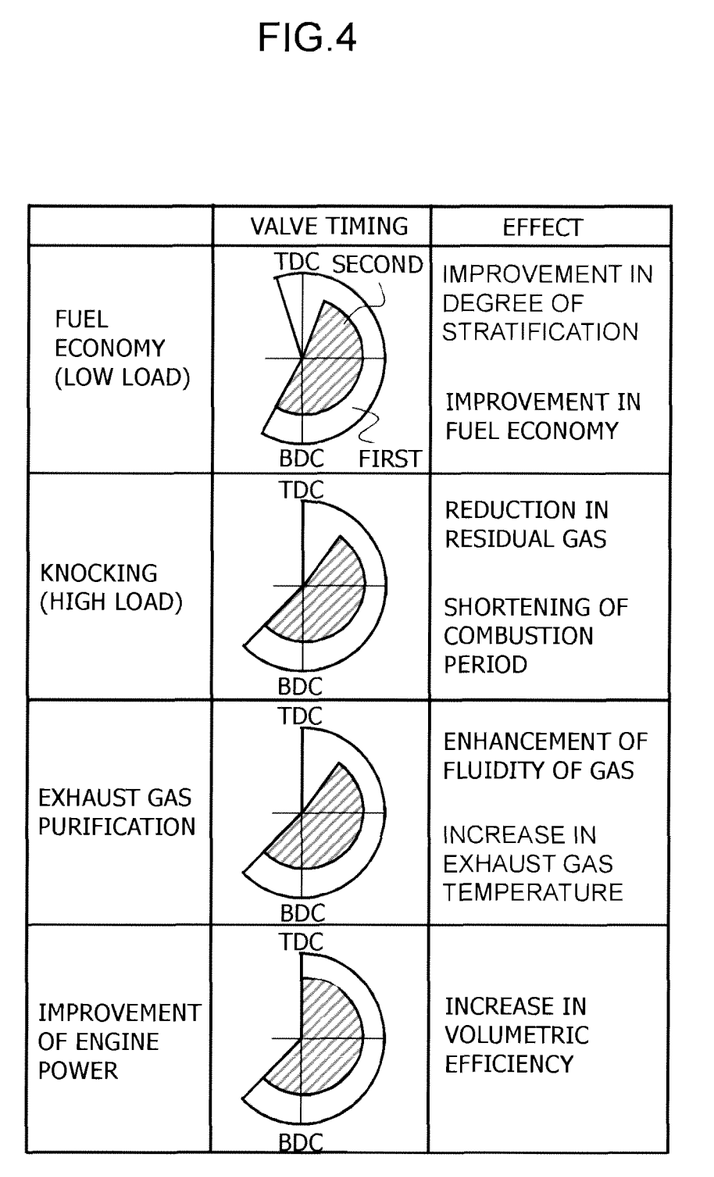
FIG. 4 is a chart illustrating the outline of control performed by the variable valve mechanism according to the embodiment of the present invention.

For example, as illustrated in FIG. 4, the operating conditions of engine 101 are divided into cases, such as a low-load range for enhancement of fuel economy, a high-load range for suppression of knocking, the time of warm-up operation for exhaust gas purification, and the time of acceleration for improvement of engine power, to set a target value for the valve timing of intake valve 105a, 105b in each case, respectively.

An operating condition for enhancement of fuel economy is a low-revolution and low-load operating condition required to give preference to fuel economy over power output. In this operating condition for enhancement of fuel economy, control apparatus 201 causes first variable valve mechanism 114a to advance the rotational phase of the intake camshaft and causes second variable valve mechanism 114a to set the valve operation angle of second intake valve 105b smaller than that of first intake valve 105a. This leads to setting the opening timing IVO of first intake valve 105a before a top dead center TDC, the opening timing IVO of second intake valve 105b after the top dead center TDC, and the closing timing IVC of first intake valve 105a and the closing timing IVC of second intake valve 105b approximately in the same timing after a bottom dead center BDC, to thereby enhance fuel economy by means of stratified combustion. Here, as an example, the opening timing IVO of first intake valve 105a is set to BTDC 8 deg, the opening timing IVO of second intake valve 105b is set to ATDC 36 deg, the closing timing IVC of first intake valve 105a and the closing timing IVC of second intake valve 105b are set to ABDC 40 deg.

A condition for suppression of knocking is an operating condition on a high-load side after warm-up during which knocking tends to occur. In this condition for suppression of knocking, control apparatus 201 causes first variable valve mechanism 114a to retard the rotational phase of the intake camshaft while keeping the valve operation angle of intake valve 105a, 105b equivalent to that in the condition for enhancement of fuel economy. Then, control apparatus 201 causes the valve timing of intake valve 105a, 105b to delay from that in the condition for enhancement of fuel economy, to thereby set the opening timing IVO of first intake valve 105 near the top dead center. This leads to reduction in the amount of internal EGR gas and an increase in the rate of combustion due to an increase in the gas flow, thus suppressing knocking.

A condition for exhaust gas purification is the time of warm-up operation of engine 101 required to increase the temperature of catalytic converter 112 quickly to an activation temperature. At the time of warm-up operation, control apparatus 201 sets the same valve timings as those in the condition for suppression of knocking. This enables ignition at a more delayed ignition timing, and the retardation of the ignition timing increases the exhaust gas temperature, stimulating the activity of catalytic converter 112.

A condition for improvement of engine power is an operating condition at acceleration or in an intermediate- or high-load range required to give preference to engine power over fuel economy. In this condition for improvement of engine power, control apparatus 201 causes second variable valve mechanism 114b to set the valve operation angle of second intake valve 105b equivalent to that of first intake valve 105a while causing first variable valve mechanism 114a to keep the rotational phase of the intake camshaft equivalent to that in the condition for suppression of knocking and the condition for exhaust gas purification. Then, the opening timings IVO of intake valves 105a and 105b are both set near the top dead center, and the closing timings IVC of intake valves 105a and 105b are both set approximately in the same timing after the bottom dead center. This leads to an increase in the volumetric efficiency of fresh air, achieving homogeneous combustion.

Hereunder is a detailed description of control of valve timings and control of fuel injection performed by control apparatus 201 in the above-mentioned condition for enhancement of fuel economy.

Figure 5:
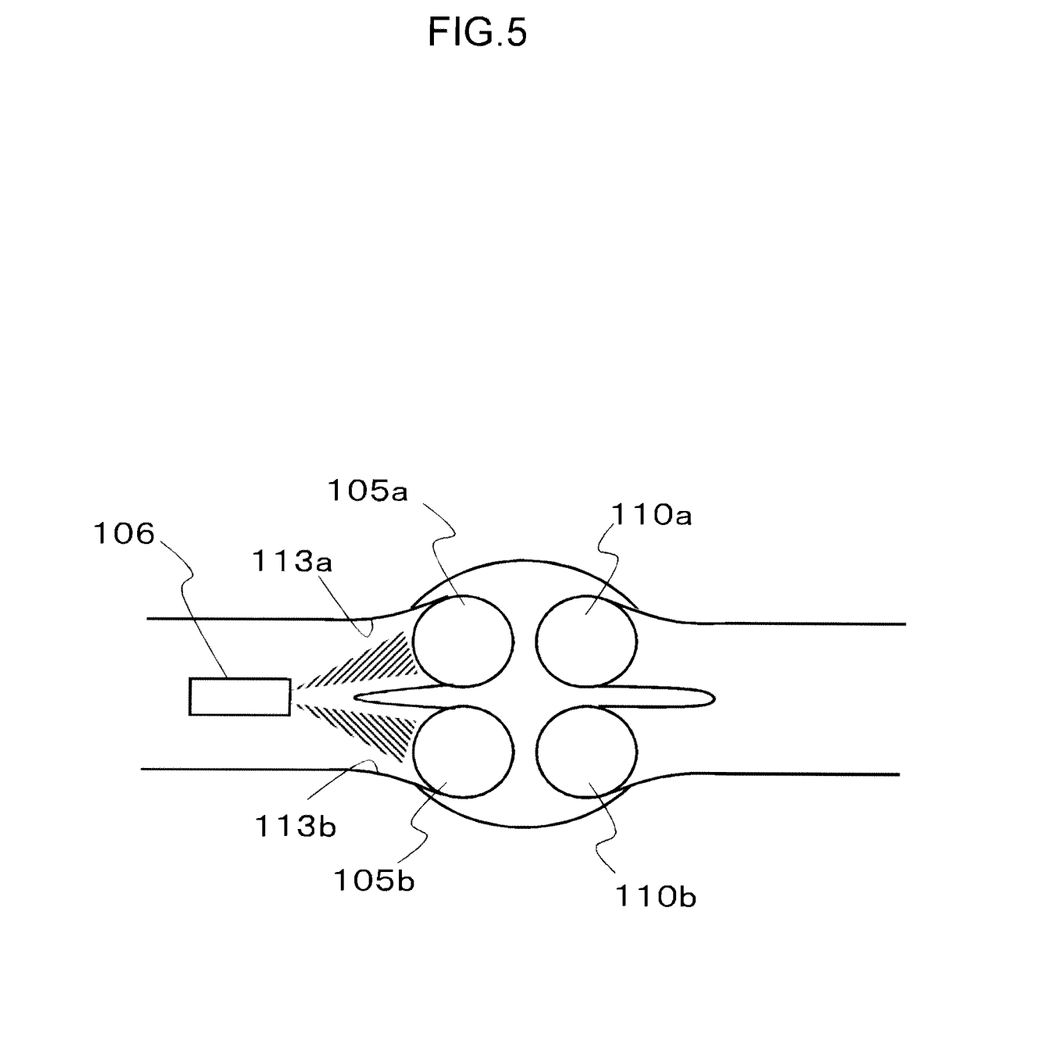
FIG. 5 is a diagram illustrating a fuel injector according to the embodiment of the present invention.
Figure 6:
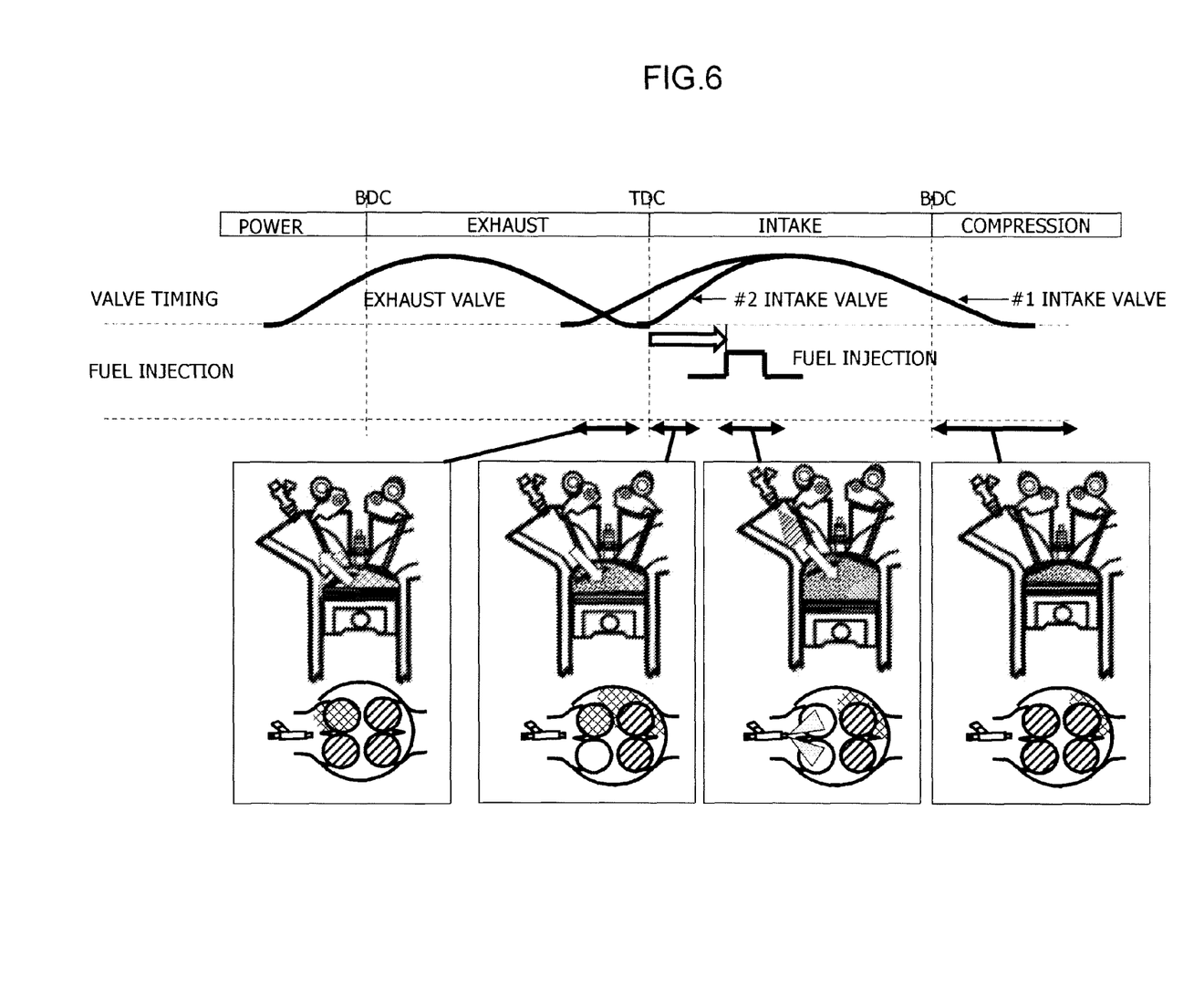
FIG. 6 is a diagram illustrating valve timings and an injection timing according to the embodiment of the present invention.

First, as illustrated in FIG. 5, engine 101 includes, in intake pipe 102, a fuel injector having one fuel injection valve 106 for each cylinder, and with reference to FIG. 6, description will be made of control when this fuel injection valve 106 injects fuel in two directions toward first intake valve 105a and toward second intake valve 105b.

In the condition for enhancement of fuel economy, as mentioned above, control apparatus 201 sets the opening timing IVO of first intake valve 105a before the top dead center, the opening timing IVO of second intake valve 105b after the top dead center TDC, and the closing timing IVC of first intake valve 105a and the closing timing IVC of second intake valve 105b approximately in the same timing after the bottom dead center BDC.

Note that the closing timing EVC of exhaust valve 110a, 110b is set near the top dead center and the opening timing EVO of exhaust valve 110a, 110b is set near the bottom dead center. As an example, the closing timing EVC of exhaust valve 110a, 110b is set to ATDC 23 deg and the opening timing EVO of exhaust valve 110a, 110b is set to BBDC 5 deg.

As a result, first intake valve 105a is opened in an exhaust stroke of the piston traveling upward. When first intake valve 105a is open while the piston is traveling upward, burned gas in the combustion chamber blows back into first intake port 113a upstream of first intake valve 105a.

Then, in the open state of first intake valve 105a, the gas blown back into first intake port 113a until the piston reaches the top dead center TDC is drawn into combustion chamber 104 after the piston turns downward to switch to an intake stroke. Following the drawing of internal EGR gas, fresh air is drawn into combustion chamber 104 through first intake valve 105a.

On the other hand, second intake valve 105b is not opened in the exhaust stroke of the piston traveling upward. Since second intake valve 105b is opened in the intake stroke after the piston reaches the top dead center TDC, burned gas does not blow back to second intake port 113b upstream of second intake valve 105b.

Here, since first intake valve 105a and second intake valve 105b are opened with a phase difference, a swirl flow is generated in combustion chamber 104. Then, since an open state of both of intake valves 105a and 105b continues after the bottom dead center BDC, the swirl flow that is generated at the beginning of opening the valves remains and hence the swirl flow in combustion chamber 104 is strengthened. As a result, the means flow rate in combustion chamber 104 increases to increase the kinetic energy of gas in combustion chamber 104, so that mixing of fresh air and fuel can be promoted.

Note that, when first intake valve 105a is closed in the middle of the intake stroke immediately after the introduction of internal EGR gas into combustion chamber 104 is nearly completed, the swirl flow is weakened. In contrast to this, if intake valves 105a and 105b are opened with a phase difference in such a manner that the open state of both valves continues after the bottom dead center BDC, the swirl flow can be strengthened.

However, when the gas flow in the combustion chamber is enhanced, fuel is more likely to be mixed into internal EGR gas and this reduces the stability of combustion, so that the amount of internal EGR gas cannot be increased sufficiently.

Therefore, control apparatus 201 sets the injection start timing of fuel injection valve 106 to such a timing to inject fuel from fuel injection valve 106 into fresh air after the gas blown back to first intake port 113a is drawn into combustion chamber 104 through first intake valve 105a.

In other words, since internal EGR gas is drawn into the combustion chamber through first intake valve 105a at the beginning of the intake stroke immediately after the piston turns downward, if fuel is injected through fuel injection valve 106 at this time, the fuel will be mixed into internal EGR gas. Therefore, fuel injection through fuel injection valve 106 is started after the beginning of the intake stroke as a period of drawing of internal EGR gas so that the internal EGR gas would be already drawn in combustion chamber 104 at the time when a spray of fuel from fuel injection valve 106 has reached first intake valve 105a.

Since this can suppress mixing of fuel in the internal EGR gas, the opening timing IVO of first intake valve 105a can be more advanced to increase the amount of internal EGR gas. Furthermore, since the gas flow is enhanced to promote mixing of fresh air and fuel, the homogeneity of the combustible gas mixture can be improved, thereby enhancing fuel economy.

Here, a delay period from the top dead center TDC until the start of fuel injection through fuel injection valve 106 can be preset as a fixed time period or a fixed crank angle. However, the more the amount of internal EGR gas blown back to first intake port 113a, the longer the time required to draw the blowback gas into the combustion chamber. Therefore, if the delay period from the top dead center TDC to the injection start timing is so set that fuel will not be mixed into the internal EGR gas even in the case of a large amount of blowback gas, the injection start timing will be delayed excessively when the amount of blowback gas is small. As a result, the time of fuel vaporization is shortened and the homogeneity of a burned combustible gas mixture is reduced, reducing combustion stability.

Figure 7:
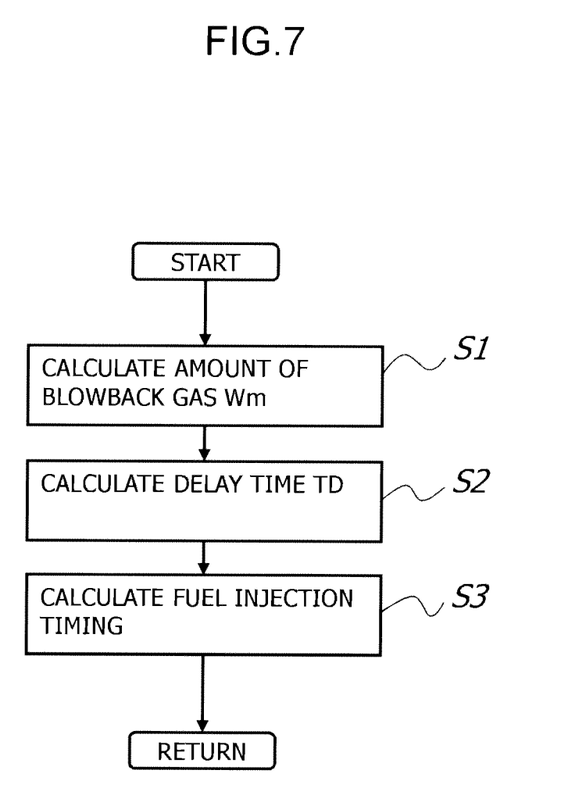
FIG. 7 is a flowchart illustrating arithmetic processing for calculating the injection timing according to the embodiment of the present invention.

The following will describe setting processing for varying the delay period from the top dead center TDC to the injection start timing according to the amount of blowback gas with reference to a flowchart of FIG. 7.

The flowchart of FIG. 7 illustrates processing for setting a delay time of starting injection performed by control apparatus 201 at fixed intervals.

First, in step S1, the amount of blowback gas Wm (cc) into first intake port 113a is calculated.

The amount of blowback gas Wm can be calculated, for example, by using an estimation method disclosed in Japanese Laid-Open Patent Publication No. 2004-044548.

Specifically, based on the amount of valve lift of first intake valve 105a per crank angle and the opening timing IVO of first intake valve 105b, a valve opening area AWm of first intake valve 105a at a valve overlap time is calculated. Then, based on this valve opening area AWm, a basic amount of blowback gas Wm0 at the valve overlap time is calculated.

Here, as the valve opening area AWm increases, the basic amount of blowback gas Wm0 is set to a greater value.

Then, this basic amount of blowback gas Wm0 is subjected to correction according to an intake air pressure or the engine speed at the time to calculate the amount of blowback gas Wm.

In the correction according to the intake air pressure, as intake pipe pressure as the upstream pressure of first intake valve 105a increases, the amount of blowback gas Wm is corrected by a smaller amount. Furthermore, as the engine speed Ne increases, the amount of blowback gas Wm is corrected by a smaller amount.

In the following step S2, based on the amount of blowback gas Wm obtained in step S1, the time TD (ms) required to draw the blowback gas into the combustion chamber is calculated.

If the cylinder volume of one cylinder is denoted as VOL (cc) and one intake air cycle time is denoted as T1 (ms), the time TD is calculated based on the following equation:

$$TD = (Wm/VOL) \times T1,$$

where one intake air cycle time T1 (ms) is based on the engine speed Ne (rpm) and calculated based on the following equation:

$$T1 = (60 \times 1000)/Ne/2.$$

Furthermore, the cylinder volume VOL (cc) of one cylinder is based on the cylinder bore and the piston stroke, and calculated based on the following equation:

$$VOL = (bore/2)^2 \times \pi \times stroke.$$

In step S3, the injection start timing of fuel injection valve 106 is set at a point of time when the time TD has elapsed from the top dead center TDC at which the drawing of blowback gas into combustion chamber 104 was started.

Since there is a transit time until fuel injected from fuel injection valve 106 reaches intake valve 105, the time TD can be corrected by the transit time. Since the fuel transit time is a short time, if the injection start timing is decided based on the time TD, mixing of fuel into internal EGR gas can be suppressed sufficiently.

Furthermore, a map storing time TD that makes an allowance for the amount of blowback gas Wm at the time is set for each operating range classified by the engine load and the engine speed, so that the time TD stored in association with the engine load and the engine speed at the time can be retrieved from the map.

As mentioned above, when the amount of blowback gas Wm is large, the injection start timing of fuel injection valve 106 is more delayed because the time until the blowback gas is drawn into the combustion chamber becomes longer. This allows the injection start timing of fuel injection valve 106 to be set at as early timing as possible while suppressing mixing of fuel injected from fuel injection valve 106 into internal EGR gas. Then, if the injection start timing of fuel injection valve 106 can be set at as early timing as possible, the vaporization time for a spray of fuel can be made longer and the homogeneity of the combustible gas mixture can be promoted, enabling an improvement in combustion stability.

Figure 8:
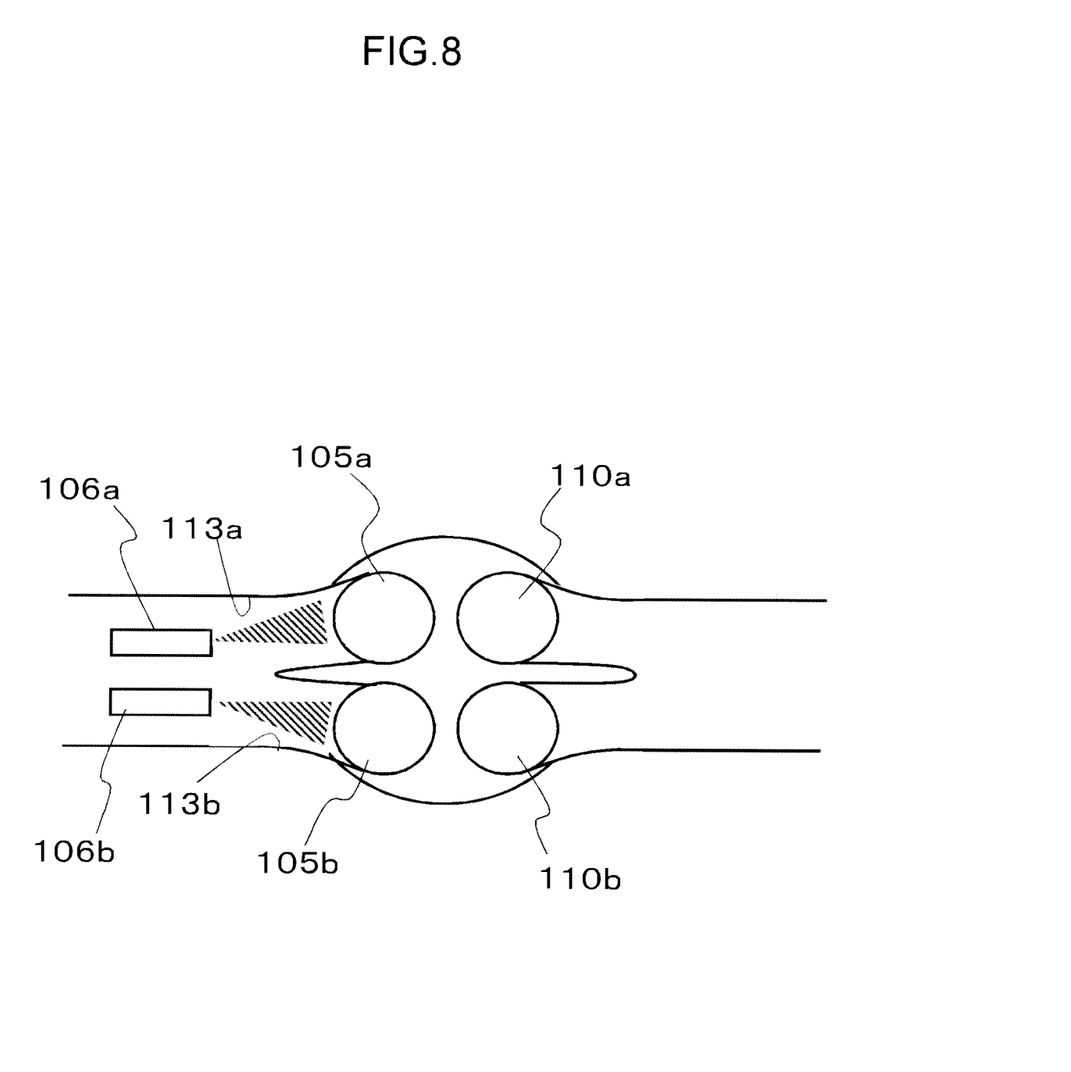
FIG. 8 is a diagram illustrating another type of fuel injector according to the embodiment of the present invention.

In the meantime, as illustrated in FIG. 8, even in an engine 101 equipped with a fuel injector composed of a first fuel injection valve 106a for injecting fuel toward first intake valve 105a and a second fuel injection valve 106b for injecting fuel toward second intake valve 105b, the valve timings of intake valves 105a and 105b can be set in the manner as mentioned above to set the injection start timing of fuel toward first intake valve 105a.

When first fuel injection valve 106a and second fuel injection valve 106b are provided, first fuel injection valve 106a for injecting fuel toward first intake valve 105a is required to start fuel injection after internal EGR gas is drawn into the combustion chamber in order to improve combustion quality. On the other hand, second fuel injection valve 106b for injecting fuel toward second intake valve 105b with no occurrence of blowback does not need to inject fuel at the same timing as first fuel injection valve 106a.

Figure 9:
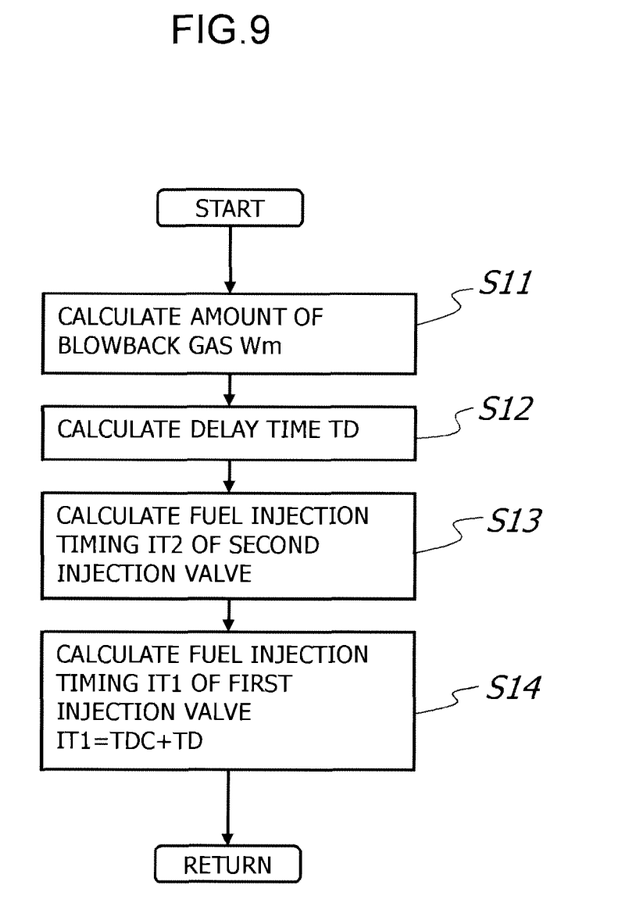
FIG. 9 is a flowchart illustrating arithmetic processing for calculating injection timings according to the embodiment of the present invention.

Therefore, in engine 101 equipped with first fuel injection valve 106a and second fuel injection valve 106b, control apparatus 201 can set the injection start timing of first fuel injection valve 106a and the injection start timing of second fuel injection valve 106b individually according to a flowchart of FIG. 9.

The flowchart of FIG. 9 illustrates processing for setting injection start timing performed by control apparatus 201 at fixed intervals.

In step S11, the amount of blowback gas Wm (cc) is calculated in the same manner as in step S1, and in step S12, the time TD (ms) required to draw blowback gas into combustion chamber 104 is calculated in the same manner as in step S2.

In step S13, injection start timing IT2 of second fuel injection valve 106b is calculated. As mentioned above, the injection start timing IT2 of second fuel injection valve 106b can be set at timing different from injection start timing IT1 of first fuel injection valve 106a. Even when second fuel injection valve 106b starts fuel injection at timing earlier than the injection start timing IT1 of first fuel injection valve 106a, mixing of fuel into internal EGR gas can be suppressed.

Thus, the injection start timing IT2 of second fuel injection valve 106b can be set to timing at which sufficient fuel vaporization time can be secured and fuel can be homogeneously mixed with fresh air drawn into the combustion chamber through second intake valve 105b.

Figure 10:
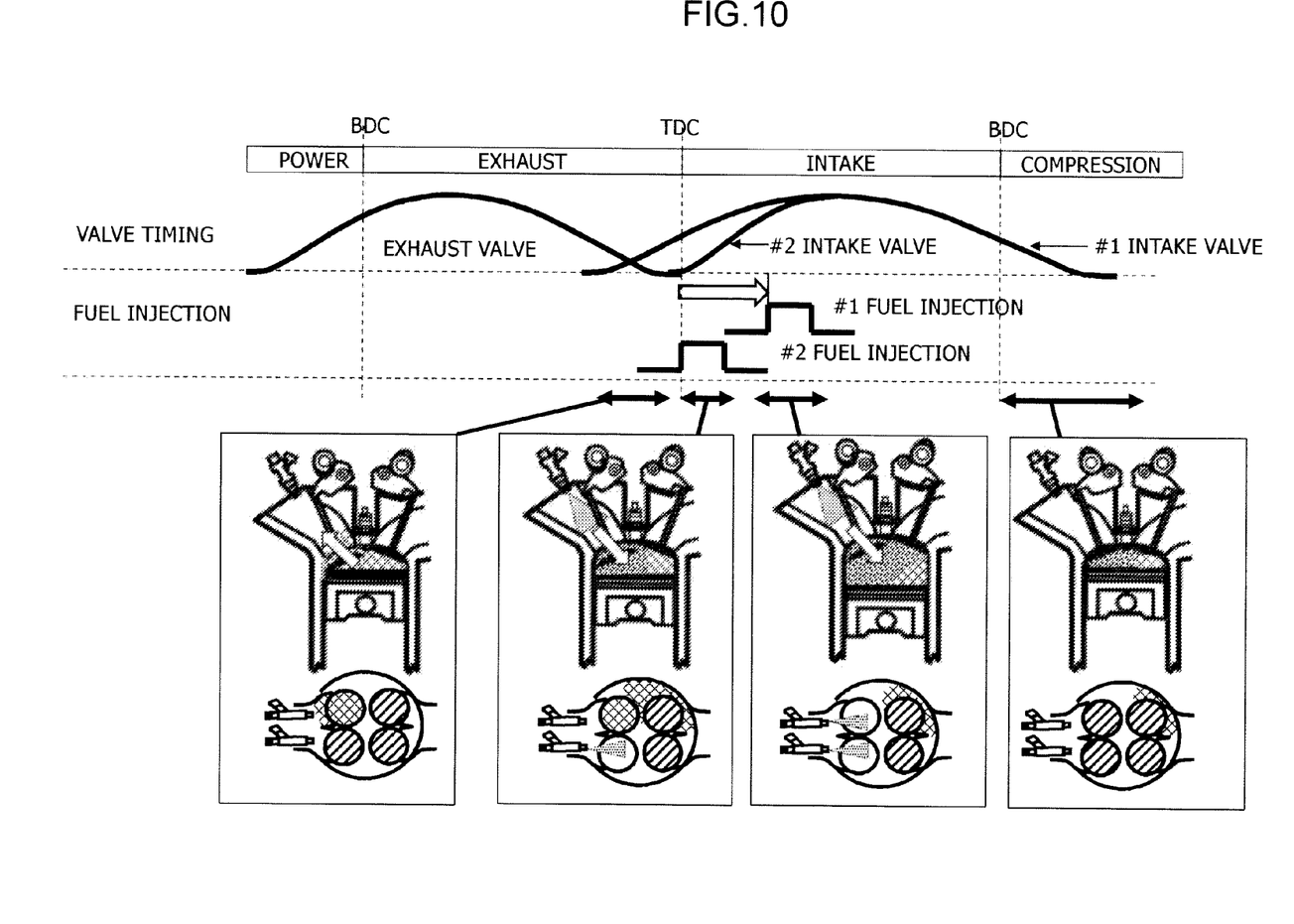
FIG. 10 is a diagram illustrating valve timings and injection timings according to the embodiment of the present invention.

Specifically, for example, as illustrated in FIG. 10, the opening timing IVO of second intake valve 105b is set as the injection start timing IT2 of second fuel injection valve 106b. In this way, if second fuel injection valve 106b starts injection in synchronization with the opening timing IVO of second intake valve 105b, fuel can be injected when the gas flow drawn into the combustion chamber through second intake valve 105b is enhanced. This can lead to homogenous combustible gas mixture and sufficient vaporization time for a spray of fuel can be secured.

Note that the injection start timing 1T2 of second fuel injection valve 106b is not limited to the opening timing IVO of second intake valve 105b. For example, it can be set before the opening timing IVO of second intake valve 105b.

In step S14, the injection start timing IT1 of first fuel injection valve 106a is set in the same manner as in step S3 to a point of time when the time TD has elapsed from the top dead center TDC at which the drawing of blowback gas into the combustion chamber is started.

In the example illustrated in FIG. 10, the injection pulse width of first fuel injection valve 106a and the injection pulse width of second fuel injection valve 106b are set equivalent to each other. In other words, half the amount of fuel required in accordance with the amount of fresh air drawn into combustion chamber 104 is injected from first fuel injection valve 106a, and the other half is injected from second fuel injection valve 106b.

Note that internal EGR gas and fresh air are drawn into combustion chamber 104 through first intake valve 105a, while fresh air is drawn into combustion chamber 104 through second intake valve 105b. The amount of fresh air passing through second intake valve 105b is larger than the amount of fresh air passing through first intake valve 105a.

Figure 11:
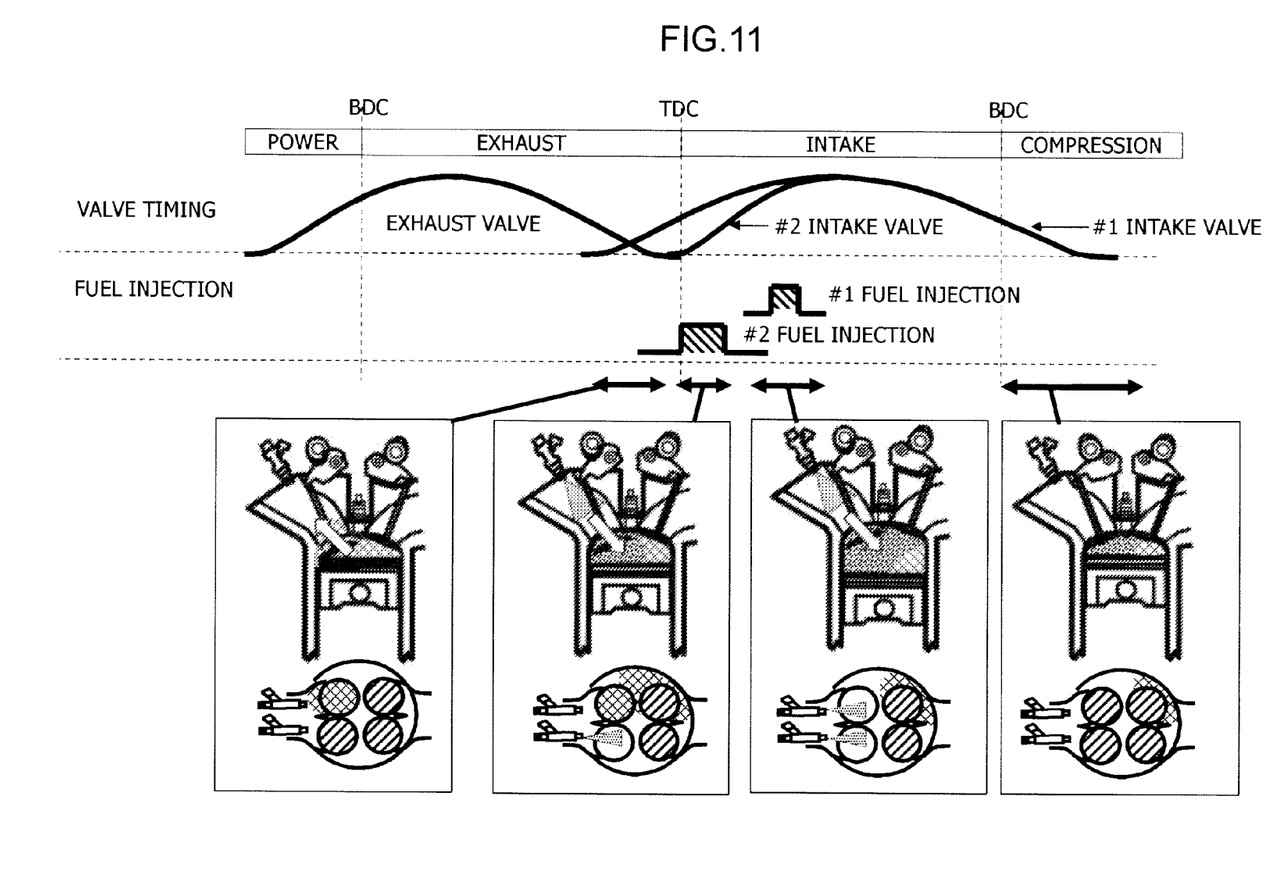
FIG. 11 is a diagram illustrating valve timings, injection timings, and the amounts of fuel injection according to the embodiment of the present invention.

Therefore, in order to form a homogenous combustible gas mixture, the amount of fuel injected by second fuel injection valve 106b can be set larger than the amount of fuel injected by first fuel injection valve 106a as illustrated in FIG. 11.

Here, the ratio between the amount of fuel injection of first fuel injection valve 106a and the amount of fuel injection of second fuel injection valve 106b is fixed to a preset constant value, so that first fuel injection valve 106a and second fuel injection valve 106b can inject, according to the ratio, shared amounts of fuel that match the amounts of fresh air, respectively.

Furthermore, in response to a change in the amount of fresh air passing through first intake valve 105a according to the amount of internal EGR gas, the ratio between the amount of fuel injection of first fuel injection valve 106a and the amount of fuel injection of second fuel injection valve 106b can be set variable.

Figure 12:
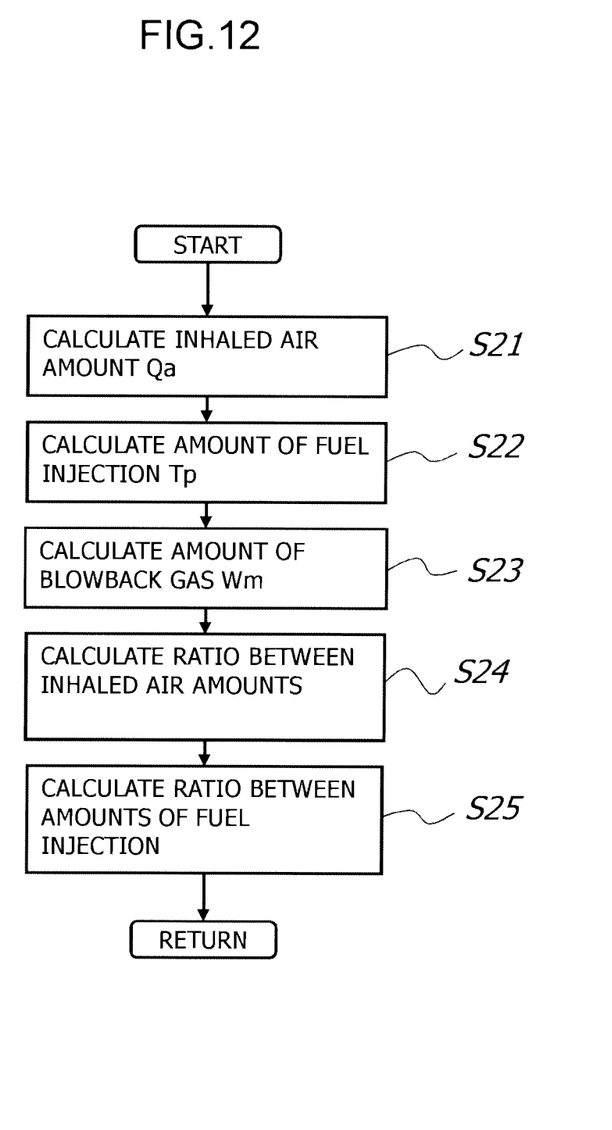
FIG. 12 is a flowchart illustrating arithmetic processing for calculating a ratio between the amounts of fuel injection according to the embodiment of the present invention.

A flowchart of FIG. 12 illustrates processing for setting an injection amount ratio performed by control apparatus 201 at fixed intervals.

In step S21, the drawn air amount Qa is calculated based on a signal of intake air amount sensor 103.

In step S22, the amount of fuel injection Tp is calculated based on the drawn air amount Qa, the engine speed Ne, and the like.

In step S23, the amount of blowback gas Wm is calculated in the same manner as in step S1 mentioned above.

In step S24, a ratio between the amount of fresh air drawn into combustion chamber 104 through first intake valve 105a and the amount of fresh air drawn into combustion chamber 104 through second intake valve 105b is calculated.

Here, fresh air and blowback gas are drawn into combustion chamber 104 through first intake valve 105a, and the total amount of fresh air and blowback gas becomes almost the same as the amount of fresh air drawn into combustion chamber 104 through second intake valve 105a.

In other words, if the amount of fresh air drawn through first intake valve 105a is denoted as Qa1 and the amount of fresh air drawn through second intake valve 105b is denoted as Qa2, Qa+Wm will be the total amount of gas drawn into the combustion chamber. Since half the total amount becomes almost the same as the amount of fresh air Qa2 drawn through second intake valve 105b, the amount of fresh air Qa2 can be determined as Qa2=(Qa+Wm)/2.

On the other hand, since Qa2=Qa1+Wm, the amount of fresh air Qa1 can be determined as Qa1=Qa2−Wm=(Qa+Wm)/2−Wm, and the ratio of the amounts of fresh air is as follows: Qa1:Qa2=(Qa+Wm)/2−Wm:(Qa+Wm)/2.

Since fuel has just to be injected from first fuel injection valve 106a and second fuel injection valve 106b at a ratio corresponding to the ratio of the amounts of fresh air, the amount of fuel injection Tp1 from first fuel injection valve 106a and the amount of fuel injection Tp2 from second fuel injection valve 106b are calculated in the following step S25 based on the above-mentioned ratio of the amounts of fresh air.

In other words, the respective amounts of injection Tp1 and Tp2 are calculated as Tp1=Tp×Qa1/Qa and Tp2=Tp×Qa2/Qa to achieve Tp=Tp1+Tp2 and Tp1:Tp2=Qa1:Qa2.

Thus, when the respective amounts of fuel injection of fuel injection valves 106a and 106b are set individually in response to the difference between the amounts of fresh air passing through the intake valves 105a and 105b, respectively, an amount of fuel capable of achieving a target air-fuel ratio to fresh air passing through each intake valve 105a, 105b is injected, so that homogenous combustible gas mixture with the target air-fuel ratio can be generated, thereby improving combustion stability.

When first fuel injection valve 106a and second fuel injection valve 106b are provided, these fuel injection valves 106a and 106b can be spaced in upstream and downstream directions of intake pipe 102.

An electromagnetic drive valve operated by a magnetic attractive force of an electromagnet can be used as intake valve 105a, 105b.

Furthermore, in engine 101 equipped with first fuel injection valve 106a and second fuel injection valve 106b, the delay time from the injection start timing of second fuel injection valve 106b to the injection start timing of first fuel injection valve 106a can be set according to the amount of blowback internal EGR gas to start injection from first fuel injection valve 106a when the delay time has elapsed after the start of injection from second fuel injection valve 106b. Thus, the reference position of the injection start timing of first fuel injection valve 106a is not limited to the top dead center.

Furthermore, fuel can be given from second fuel injection valve 106a in two separate injections before and after second intake valve 105b is opened, or in multiple separate injections after second intake valve 105b is opened.

Furthermore, a two-direction fuel injection valve for injecting fuel toward both first intake valve 105a and second intake valve 105b, and a one-way fuel injection valve for injecting fuel toward second intake valve 105b can be so provided that an amount of fuel matching the amount of fresh air passing through first intake valve 105a is injected from the two-direction fuel injection valve and an amount of fuel matching the amount of fresh air passing through second intake valve 105b is obtained from the sum of the amount of injection from the two-direction fuel injection valve and the amount of injection from the one-direction fuel injection valve.

Furthermore, first fuel injection valve 106a and second fuel injection valve 106b may have the same spray characteristics or fuel injection valves different in angle of spray, atomized particle size, or the like can be used. In addition, a fuel supply pressure to first fuel injection valve 106a can be made different from a fuel supply pressure to second fuel injection valve 106b.

Furthermore, the closing timing of first intake valve 105a and the closing timing of second intake valve 105b can be set to different timings after the bottom dead center. For example, the opening period of first intake valve 105a and the opening period of second intake valve 105b can be set to the same period to set the closing timing IVC of first intake valve 105a earlier than the closing timing IVC of second intake valve 105b.

The entire contents of Japanese Patent Application No. 2011-160142, filed Jul. 21, 2011, are incorporated herein by reference.

While only a select embodiment have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention, the invention as claimed in the appended claims and their equivalents.

What is claimed is:

1. A control apparatus for an internal combustion engine equipped with a first intake valve and a second intake valve provided in each combustion chamber, a fuel injector provided in an intake port to inject fuel toward each of the first intake valve and the second intake valve, and a variable valve mechanism for changing a valve timing of the first intake valve and a valve timing of the second intake valve to valve timings different from each other, the control apparatus comprising:
   a first control section for controlling the variable valve mechanism to set an opening timing of the first intake valve before a top dead center and an opening timing of the second intake valve after the top dead center, and set both a closing timing of the first intake valve and a closing timing of the second intake valve after a bottom dead center; and
   a second control section for setting a fuel injection start timing of the fuel injector toward the first intake valve to a timing delayed from the top dead center as an amount of gas blown back to the intake port side through the first intake valve increases in the valve timing settings made by the first control section.

2. The control apparatus for the internal combustion engine according to claim 1, further comprising
   an estimation section for estimating the amount of gas blown back to the intake port side through the first intake valve based on the opening timing of the first intake valve, an intake air pressure of the internal combustion engine, and a revolution speed of the internal combustion engine.

3. The control apparatus for the internal combustion engine according to claim 1, wherein
   the fuel injector includes a first fuel injection valve for injecting fuel toward the first intake valve and a second fuel injection valve for injecting fuel toward the second intake valve, and
   the second control section sets a fuel injection start timing of the first fuel injection valve to a timing more delayed from the top dead center as the amount of gas blown back to the intake port side through the first intake valve increases and a fuel injection start timing of the second fuel injection valve before the fuel injection start timing of the first fuel injection valve.

4. The control apparatus for the internal combustion engine according to claim 1, wherein
   the fuel injector includes a first fuel injection valve for injecting fuel toward the first intake valve and a second fuel injection valve for injecting fuel toward the second intake valve, and
   the control apparatus further comprises a third control section for setting an amount of fuel injection of the first fuel injection valve smaller than an amount of fuel injection of the second fuel injection valve in the valve timing settings made by the first control section.

5. The control apparatus for the internal combustion engine according to claim 4, wherein
   as an amount of gas blown hack to the intake port side through the first intake valve increases, the third control section sets the amount of fuel injection of the first fuel injection valve further smaller.

6. The control apparatus for the internal combustion engine according to claim 4, wherein
   the third control section sets the amount of fuel injection of the first fuel injection valve and the amount of fuel injection of the second fuel injection valve according to a ratio between an amount of fresh air drawn into a combustion chamber through the first intake valve and an amount of fresh air drawn into the combustion chamber through the second intake valve.

7. The control apparatus for the internal combustion engine according to claim 1, wherein
   the first control section sets, in a low-revolution and low-load range of the internal combustion engine, the opening timing of the first intake valve before the top dead center and the opening timing of the second intake valve after the top dead center, and both the closing timing of the first intake valve and the closing timing of the second intake valve after the bottom dead center.

8. The control apparatus for the internal combustion engine according to claim 1, wherein the first control section sets the closing timing of the first intake valve and the closing timing of the second intake valve to an identical timing after the bottom dead center.

9. The control apparatus for the internal combustion engine according to claim 1, wherein
the fuel injector is equipped with a fuel injection valve for injecting fuel in two directions toward the first intake valve and toward the second intake valve.

10. A control apparatus for an internal combustion engine equipped with a first intake valve and a second intake valve provided in each combustion chamber, a fuel injector provided in an intake port to inject fuel toward each of the first intake valve and the second intake valve, and a variable valve mechanism for changing a valve timing of the first intake valve and a valve timing of the second intake valve to valve timings different from each other, the control apparatus comprising:
first control means for controlling the variable valve mechanism to set an opening timing of the first intake valve before a top dead center and an opening timing of the second intake valve after the top dead center, and set both a closing timing of the first intake valve and a closing timing of the second intake valve after a bottom dead center; and
second control means for setting a fuel injection start timing of the fuel injector toward the first intake valve to a timing more delayed from the top dead center as an amount of gas blown back to the intake port side through the first intake valve increases in the valve timing settings made by the first control means.

* * * * *